United States Patent  (10) Patent No.: US 8,958,826 B2
Li et al.                (45) Date of Patent:    Feb. 17, 2015

(54) DEVICE AND METHOD FOR MOBILITY PATTERN MINING (71) Applicant: NEC (China) Co., Ltd., Beijing (CN)

(72) Inventors: Man Li, Beijing (CN); Weisong Hu, Beijing (CN); Xiaowei Liu, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 26 days.

(21) Appl. No.: 13/938,662

(22) Filed: Jul. 10, 2013

(65) Prior Publication Data

US 2014/0221014 A1    Aug. 7, 2014

(30) Foreign Application Priority Data

Feb. 5, 2013 (CN) .......................... 2013 1 0046774

(51) Int. Cl.
H04W 24/00 (2009.01)
H04W 4/02 (2009.01)
G06F 17/30 (2006.01)
H04M 1/00 (2006.01)

(52) U.S. Cl.
CPC .............. H04W 4/028 (2013.01); G06F 17/30 (2013.01); H04M 1/00 (2013.01)
USPC ....................................... 455/456.3

(58) Field of Classification Search
USPC ....................................... 455/456.3
See application file for complete search history.

(56) References Cited

U.S. PATENT DOCUMENTS 6,385,454 B1 * 5/2002 Bahl et al. ............... 455/450

* cited by examiner

Primary Examiner — Joel Ajayi
(74) Attorney, Agent, or Firm — Tutunjian & Bitetto, P.C.

(57) ABSTRACT

A mobility pattern mining device includes: a data collecting unit configured to collect a user's historical data; a stay point obtaining unit configured to obtain stay points of the user from the historical data; an extracting unit configured to obtain a semantic tree for a certain topic and extract topic related stay points from the stay points of the user by using the semantic tree for the certain topic; a determining unit configured to determine a candidate mobility pattern of the user based on the topic related stay points; and a selecting unit configured to select a frequent mobility pattern which best matches the candidate mobility pattern of the user from a frequent mobility pattern database related to the certain topic, wherein the database is set in advance based on historical data for a plurality of users to obtain mobility patterns about topics for users.

16 Claims, 9 Drawing Sheets

DEVICE AND METHOD FOR MOBILITY PATTERN MINING

TECHNICAL FIELD

The present application relates to the technical field of data mining, and more particularly, to a device and a method for mobility pattern mining.

BACKGROUND

A user's mobility pattern reflects personal location-related interests. Based on the user's mobility pattern, related information can be provided to the user including traffic information, for example.

Currently, user mobility pattern mining is based mainly on historical location data for the user, resulting in a user mobility pattern about locations. However, this would bring the following problems.

First, existing methods focus on mining mobility patterns about locations, but cannot mine topics of a series of related locations (i.e., mobility patterns about topics cannot be obtained). For example, "user goes to the mall after work recently" is a mobility pattern about location and "house decoration" may be a topic for this mobility pattern. The user may visit many different locations for decorating house and some locations may be visited once or several times. Existing methods depend on frequency of visited locations, so they cannot find out such mobility patterns about the topic "house decoration".

Second, existing methods for mobility pattern mining cannot recognize new mobility patterns early because they require related movements to achieve a certain number of times. However, recognizing new mobility patterns early can help to improve the quality of location-based services.

Thus, there is a need for a solution capable of obtaining user mobility patterns about topics early.

SUMMARY

According to the present application, individual users' mobility patterns about topics are mined based on mobility patterns for a group of users.

According to a first aspect of the present invention, a mobility pattern mining device is provided. The device includes: a data collecting unit configured to collect a user's historical data; a stay point obtaining unit configured to obtain stay points of the user from the historical data; an extracting unit configured to obtain a semantic tree for a certain topic and extract topic related stay points from the stay points of the user by using the semantic tree for the certain topic; a determining unit configured to determine a candidate mobility pattern of the user based on the topic related stay points; and a selecting unit configured to select a frequent mobility pattern which best matches the candidate mobility pattern of the user from a frequent mobility pattern database related to the certain topic, wherein the frequent mobility pattern database is set in advance based on historical data for a plurality of users.

Preferably, the user's historical data comprises location, time, and semantics of the location.

Preferably, the extracting unit is configured to match the stay points of the user with leaf nodes of the semantic tree for the certain topic and select the matched stay points as the topic related stay points.

Preferably, the determining unit is configured to combine a sub tree of the semantic tree for the certain topic with the topic related stay points as leaf nodes to form the candidate mobility pattern of the user.

Preferably, the frequent mobility pattern which matches the candidate mobility pattern of the user best satisfies at least one of the following conditions: (1) the frequent mobility pattern and the candidate mobility pattern of the user have a maximum number of nodes of the same semantics; and (2) in the frequent mobility pattern and the candidate mobility pattern of the user, nodes of the same semantics are closest to leaf nodes.

Preferably, the semantic tree for the certain topic is obtained from WordNET.

According to a second aspect of the present invention, a frequent mobility pattern generation device is provided. The device includes: a data collecting unit configured to collect a plurality of users' historical data; a stay point obtaining unit configured to obtain stay points of each of the plurality of users from the historical data; an extracting unit configured to obtain a semantic tree for a certain topic and extract topic related stay points from the stay points of each of the users by using the semantic tree for the certain topic; a determining unit configured to determine a candidate mobility pattern of each user based on the topic related stay points of the user; and a selecting unit configured to select a frequent mobility pattern from the candidate mobility patterns of all the users.

Preferably, the extracting unit is configured to match the stay points of each user with leaf nodes of the semantic tree for the certain topic and select the matched stay points as the topic related stay points of the user.

Preferably, the determining unit is configured to combine, for each user, a sub tree of the semantic tree for the certain topic with the topic related stay points of the user as leaf nodes to form the candidate mobility pattern of the user.

Preferably, the selecting unit is configured to select, from the candidate mobility patterns of all the users, a candidate mobility pattern which occurs more than a threshold number of times as the frequent mobility pattern.

According to a third aspect of the present invention, a mobility pattern mining method is provided. The method includes: collecting a user's historical data; obtaining stay points of the user from the historical data; obtaining a semantic tree for a certain topic and extracting topic related stay points from the stay points of the user by using the semantic tree for the certain topic; determining a candidate mobility pattern of the user based on the topic related stay points; and selecting a frequent mobility pattern which best matches the candidate mobility pattern of the user from a frequent mobility pattern database related to the certain topic, wherein the frequent mobility pattern database is set in advance based on historical data for a plurality of users.

Preferably, the user's historical data comprises location, time, and semantics of the location.

Preferably, the stay points of the user are matched with leaf nodes of the semantic tree for the certain topic and the matched stay points are selected as the topic related stay points.

Preferably, a sub tree of the semantic tree for the certain topic is combined with the topic related stay points as leaf nodes to form the candidate mobility pattern of the user.

Preferably, the frequent mobility pattern which matches the candidate mobility pattern of the user best satisfies at least one of the following conditions: (1) the frequent mobility pattern and the candidate mobility pattern of the user have a maximum number of nodes of the same semantics; and (2) in the frequent mobility pattern and the candidate mobility pattern of the user, nodes of the same semantics are closest to leaf nodes.

Preferably, the semantic tree for the certain topic is obtained from WordNET.

According to a fourth aspect of the present invention, a frequent mobility pattern generation method is provided. The method includes: collecting a plurality of users' historical data; obtaining stay points of each of the plurality of users from the historical data; obtaining a semantic tree for a certain topic and extracting topic related stay points from the stay points of each of the user by using the semantic tree for the certain topic; determining a candidate mobility pattern of each user based on the topic related stay points of the user; and selecting a frequent mobility pattern from the candidate mobility patterns of all the users.

Preferably, the stay points of each user are matched with leaf nodes of the semantic tree for the certain topic and the matched stay points are selected as the topic related stay points of the user.

Preferably, for each user, a sub tree of the semantic tree for the certain topic is combined with the topic related stay points of the user as leaf nodes to form the candidate mobility pattern of the user.

Preferably, a candidate mobility pattern which occurs more than a threshold number of times is selected from the candidate mobility patterns of all the users as the frequent mobility pattern.

With the embodiments of the present application, mobility pattern about topics can be mined for users. In particular, when the amount of historical data for individual users is insufficient, the present application can obtain mobility patterns about topics for the individual users early based on mobility patterns about topics for a group of users. Thus, personalized information can be provided to users early.

BRIEF DESCRIPTION OF THE DRAWINGS

The above and other objects, features and advantages will be more apparent from the following description of embodiments with reference to the figures, in which.

DETAILED DESCRIPTION

The embodiments of the present invention will be detailed below with reference to the drawings. It should be noted that the present invention is not limited to the following embodiments. In the following description, details of well known techniques irrelevant to the present invention will be omitted so as not to obscure the concept of the invention.

Figure 1:
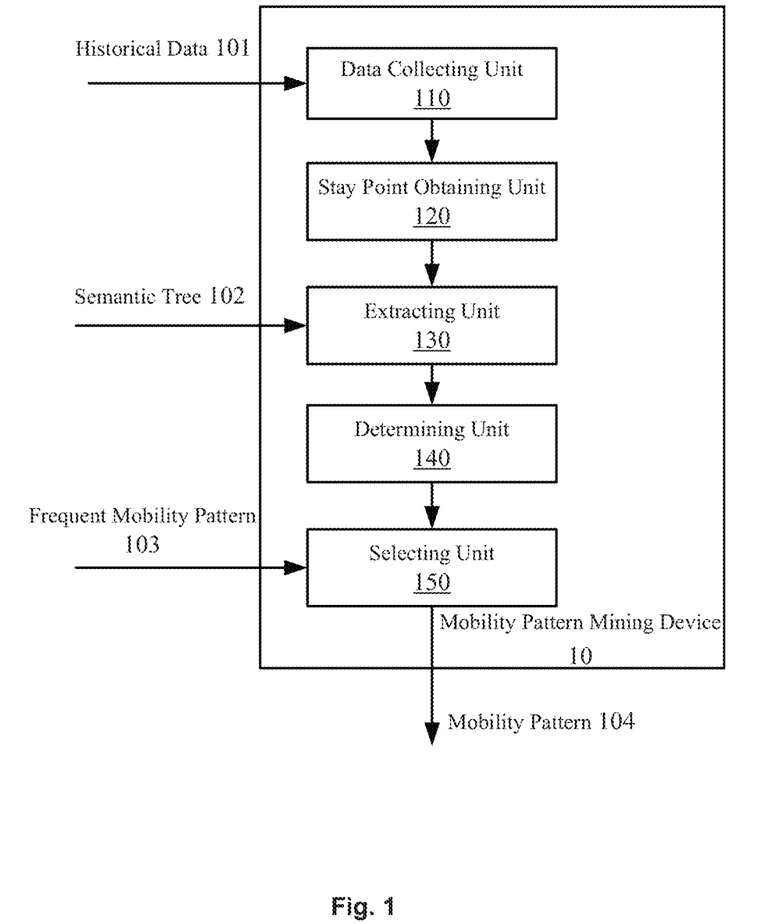
FIG. 1 is a block diagram of a mobility pattern mining device according to an embodiment of the present invention.

FIG. 1 is a block diagram of a mobility pattern mining device 10 according to an embodiment of the present invention. As shown in FIG. 1, the mobility pattern mining device 10 includes a data collecting unit 110, a stay point obtaining unit 120, an extracting unit 130, a determining unit 140, and a selecting unit 150. In the following, the operations of various units of the mobility pattern mining device 10 will be detailed with reference to FIGS. 2-5.

The data collecting unit 110 is configured to collect a user's historical data 101. For example, the user's historical data 101 may comprise location, time, and semantics of the location. Location data may comprise longitude/latitude data, and is not limited thereto.

The stay point obtaining unit 120 is configured to obtain stay points of the user from the historical data 101 collected by the data collecting unit 110. Herein, stay points refer to geographical locations in which the individual users visit over a certain threshold of time. The threshold of time can be set according to actual circumstance (for example, it can be set to 30 minutes).

The extracting unit 130 is configured to obtain a semantic tree for a certain topic and extract topic related stay points from the stay points of the user by using the semantic tree for the certain topic. Preferably, the extracting unit 130 is configured to match the stay points of the user with leaf nodes of the semantic tree for the certain topic and select the matched stay points as the topic related stay points.

In the context of the present disclosure, a semantic tree for a certain topic refers to a tree representing a conceptual hierarchy for the topic, wherein the nodes represent semantic concepts. Concepts of father nodes are higher-level abstractions of those of child nodes. The root has the highest level abstraction. The semantic tree can be derived from dictionaries or similar data sources. For example, a semantic tree for a certain topic may be derived from WordNet.

Figure 2:
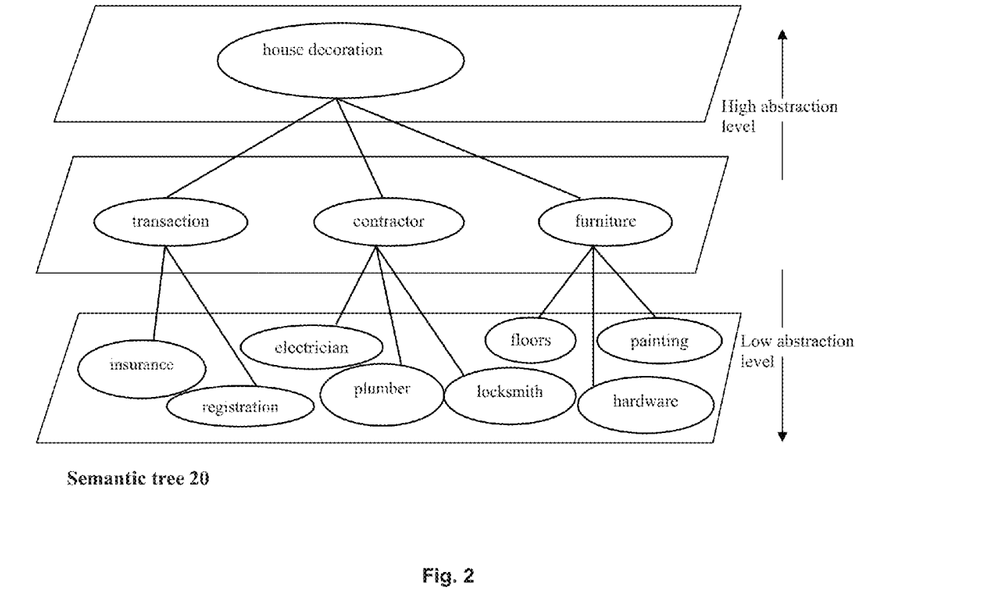
FIG. 2 is a schematic diagram showing a semantic tree of a certain topic according to an embodiment of the present invention.

FIG. 2 is a schematic diagram showing a semantic tree of a certain topic according to an embodiment of the present invention. In particular, the semantic tree 20 as shown in FIG. 2 is a semantic tree for the topic "house decoration". As shown in FIG. 2, the root of the semantic tree 20 is "house decoration", and the second layer of nodes includes "transaction", "contractor", and "furniture", which are lower concepts of the root "house decoration". The third layer of nodes includes "insurance", "registration", "electrician", "plumber", "locksmith", "floors", "hardware", and "painting", which are lower concepts of the second layer of nodes "transaction", "contractor", and "furniture".

Figure 3:
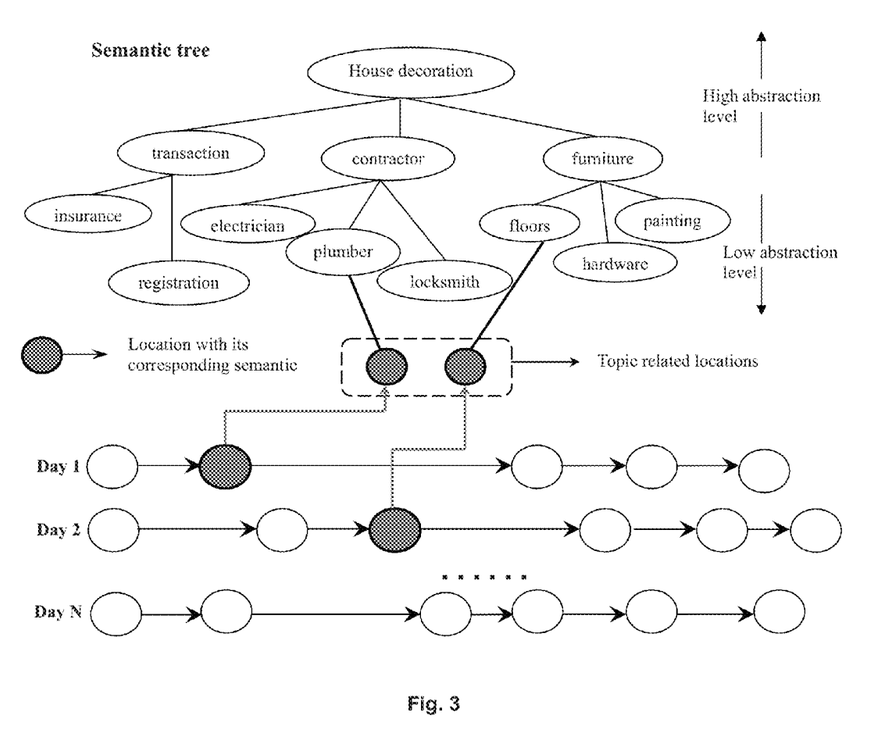
FIG. 3 is a schematic diagram showing operations of an extracting unit according to an embodiment of the present invention.

FIG. 3 is a schematic diagram showing operations of an extracting unit according to an embodiment of the present invention. In particular, the upper portion of FIG. 3 shows a semantic tree of the topic "house decoration" (see FIG. 2), and the lower portion of FIG. 3 shows a series of stay points obtained by the stay point obtaining unit 120. The extracting unit 130 matches the stay points of the series of stay points for N days with leaf nodes of the semantic tree for the certain topic, and selects the matched stay points as the topic related stay points. In the example shown in FIG. 3, the extracting unit 130 finds out that the stay points in the dashed box are matched with two nodes of the semantic tree (i.e., "plumber" and "floors"). Therefore, the extracting unit 130 selects the stay points in the dashed box as the topic related stay points.

Referring back to FIG. 1, the determining unit 140 is configured to determine a candidate mobility pattern of the user based on the topic related stay points. Preferably, the determining unit 140 is configured to combine a sub tree of the semantic tree for the certain topic with the topic related stay points as leaf nodes to form the candidate mobility pattern of the user.

Figure 4:
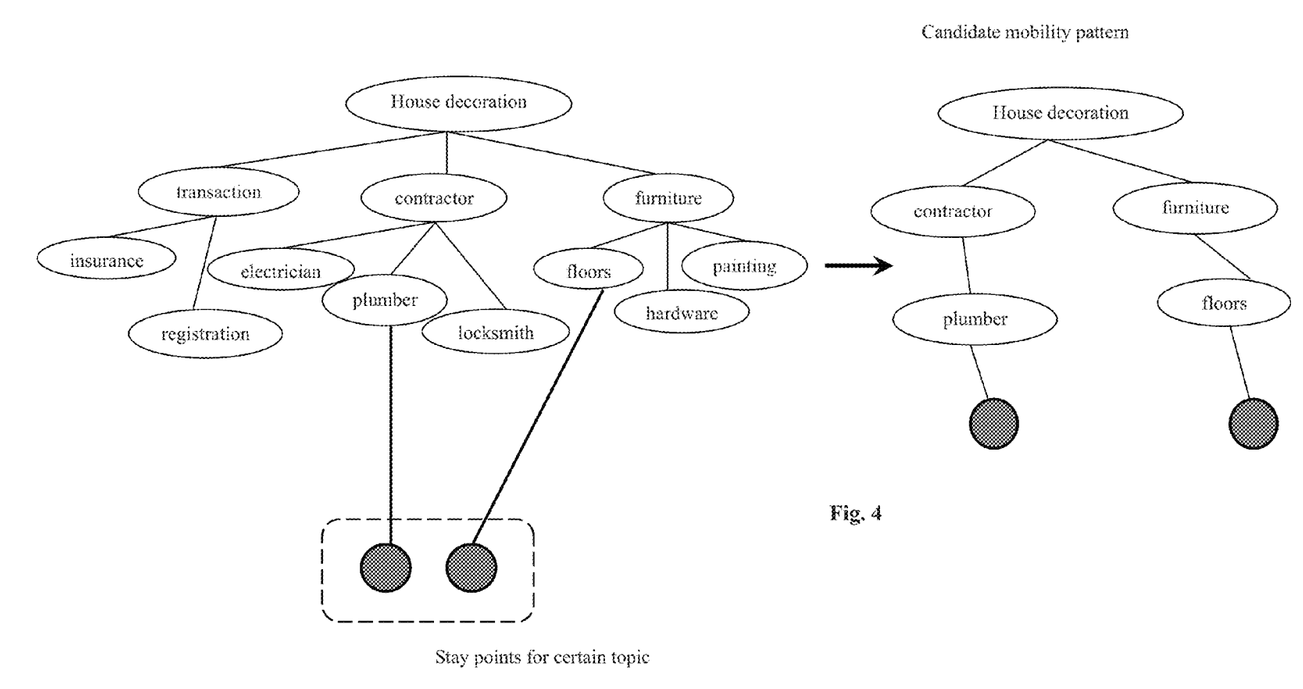
FIG. 4 is a schematic diagram showing candidate mobility patterns for users according to an embodiment of the present invention.

FIG. 4 is a schematic diagram showing candidate mobility patterns for users according to an embodiment of the present invention. The left portion of FIG. 4 shows a semantic tree of a certain topic ("house decoration") as well as locations matched with two nodes ("plumber" and "floors") of the semantic tree, i.e., the topic related stay points. Based thereupon, the determining unit 140 combines a sub tree of the semantic tree with the topic related stay points as leaf nodes to form the candidate mobility pattern of the user. The right portion of FIG. 4 shows the candidate mobility patterns obtained by the determining unit 140, in which the leaf nodes are the topic related stay points.

Referring back to FIG. 1, the selecting unit 150 is configured to select a frequent mobility pattern which best matches the candidate mobility pattern of the user from a frequent mobility pattern database related to the certain topic, as the mobility pattern 104 of the user. Herein, the frequent mobility pattern database is set in advance based on historical data for a plurality of users. In the following, the operations of the selecting unit 150 will be detailed with reference to FIG. 5.

Figure 5:
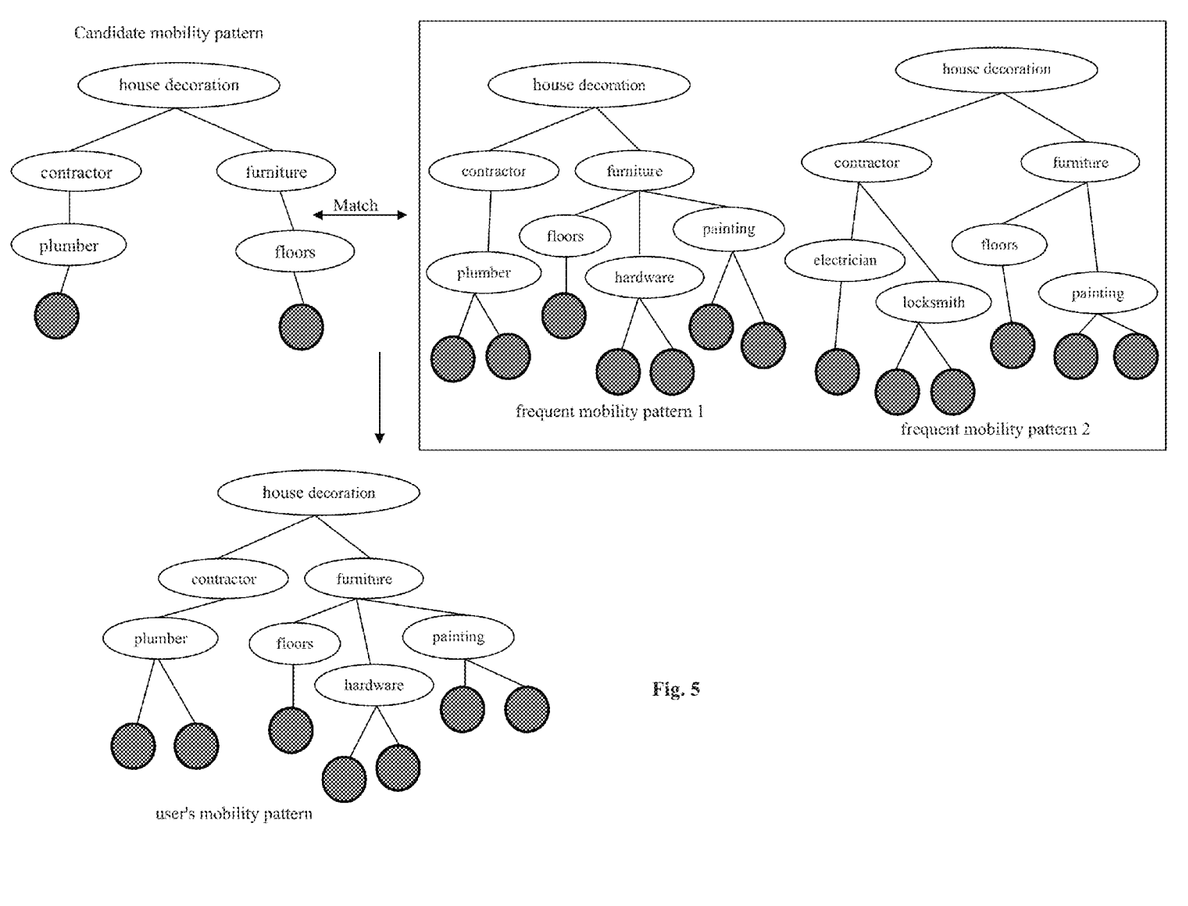
FIG. 5 is a schematic diagram showing selection of mobility patterns for users according to an embodiment of the present invention.

FIG. 5 is a schematic diagram showing selection of mobility patterns for users according to an embodiment of the present invention. The upper left corner of FIG. 5 shows the candidate mobility patterns obtained by the determining unit 140 (see FIG. 4). The upper right corner of FIG. 5 shows two frequent mobility patterns. However, it can be appreciated by those skilled in the art that the two frequent mobility patterns shown in FIG. 5 is only an example and there may be more frequent mobility patterns.

Preferably, the selecting unit 150 selects the frequent mobility pattern which best matches the candidate mobility pattern of the user based upon at least one of the following conditions: (1) the frequent mobility pattern and the candidate mobility pattern of the user have a maximum number of nodes of the same semantics; and (2) in the frequent mobility pattern and the candidate mobility pattern of the user, nodes of the same semantics are closest to leaf nodes.

As shown in FIG. 5, the candidate mobility pattern of the user and the frequent mobility pattern 1 have 4 common internal nodes ("contractor", "furniture", "plumber", and "floors"), and the candidate mobility pattern of the user and the frequent mobility pattern 2 have 3 common internal nodes ("contractor", "furniture", and "floors"). Accordingly, the selecting unit 150 selects the frequent mobility pattern 1 as the mobility pattern 104 of the user.

Alternatively, the mobility pattern of the user may also be selected based upon the number of nodes which are closest to leaf nodes and have the same semantic. Referring to FIG. 5, the frequent mobility pattern 1 and the candidate mobility pattern of the user have two nodes which are closest to leaf nodes and have the same semantic ("plumber" and "floors"), whereas the frequent mobility pattern 2 and the candidate mobility pattern of the user have only one node which is closest to leaf nodes and has the same semantic ("floors"). Accordingly, the selecting unit 150 selects the frequent mobility pattern 1 as the mobility pattern 104 of the user.

Although it has been described above that the selecting unit 150 selects the mobility pattern of the user based on conditions (1) and (2) respectively, those skilled in the art can appreciate that the selecting unit 150 selects the mobility pattern of the user based on both of conditions (1) and (2). For example, different weights may be assigned to conditions (1) and (2) and a weighted result may be considered to select the mobility pattern 104 of the user.

With the mobility pattern mining device according to an embodiment of the present invention, even if the amount of historical data for individual users is insufficient, mobility patterns about topics for the individual users can be obtained early based on mobility patterns about topics for a group of users. Thus, personalized information can be provided to individual users based on the obtained mobility patterns for the individual users.

Figure 6:
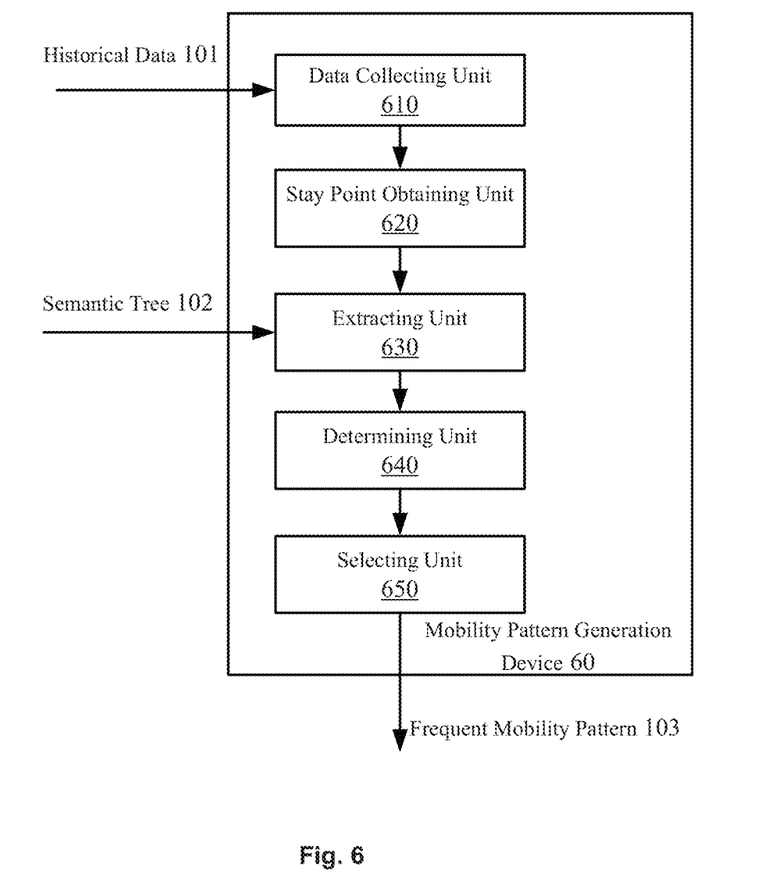
FIG. 6 is a block diagram of a frequent mobility pattern generation device according to an embodiment of the present invention.

FIG. 6 is a block diagram of a frequent mobility pattern generation device 60 according to an embodiment of the present invention, which is used to obtain a frequent mobility pattern of a user. As shown in FIG. 6, the frequent mobility pattern generation device 60 includes a data collecting unit 610, a stay point obtaining unit 620, an extracting unit 630, a determining unit 640, and a selecting unit 650.

The data collecting unit 610 is configured to collect a plurality of users' historical data 101. The user's historical data 101 may comprise location, time, and semantics of the location.

The stay point obtaining unit 620 is configured to obtain stay points of each of the plurality of users from the historical data 101 collected by the data collecting unit 610.

The extracting unit 630 is configured to obtain a semantic tree for a certain topic and extract topic related stay points from the stay points of each of the user by using the semantic tree for the certain topic. Preferably, the extracting unit 630 is configured to match the stay points of each user with leaf nodes of the semantic tree for the certain topic and select the matched stay points as the topic related stay points of the user.

The determining unit 640 is configured to determine a candidate mobility pattern of each user based on the topic related stay points of the user obtained by the extracting unit 630. Preferably, the determining unit 640 is configured to combine, for each user, a sub tree of the semantic tree for the certain topic with the topic related stay points of the user as leaf nodes to form the candidate mobility pattern of the user.

The selecting unit 650 is configured to select a frequent mobility pattern from the candidate mobility patterns of all the users determined by the determining unit 640. Preferably, the selecting unit 650 is configured to select, from the candidate mobility patterns of all the users, a candidate mobility pattern which occurs more than a threshold number of times as the frequent mobility pattern. In the following, the operations of the selecting unit 650 will be detailed with reference to FIG. 7.

Figure 7:
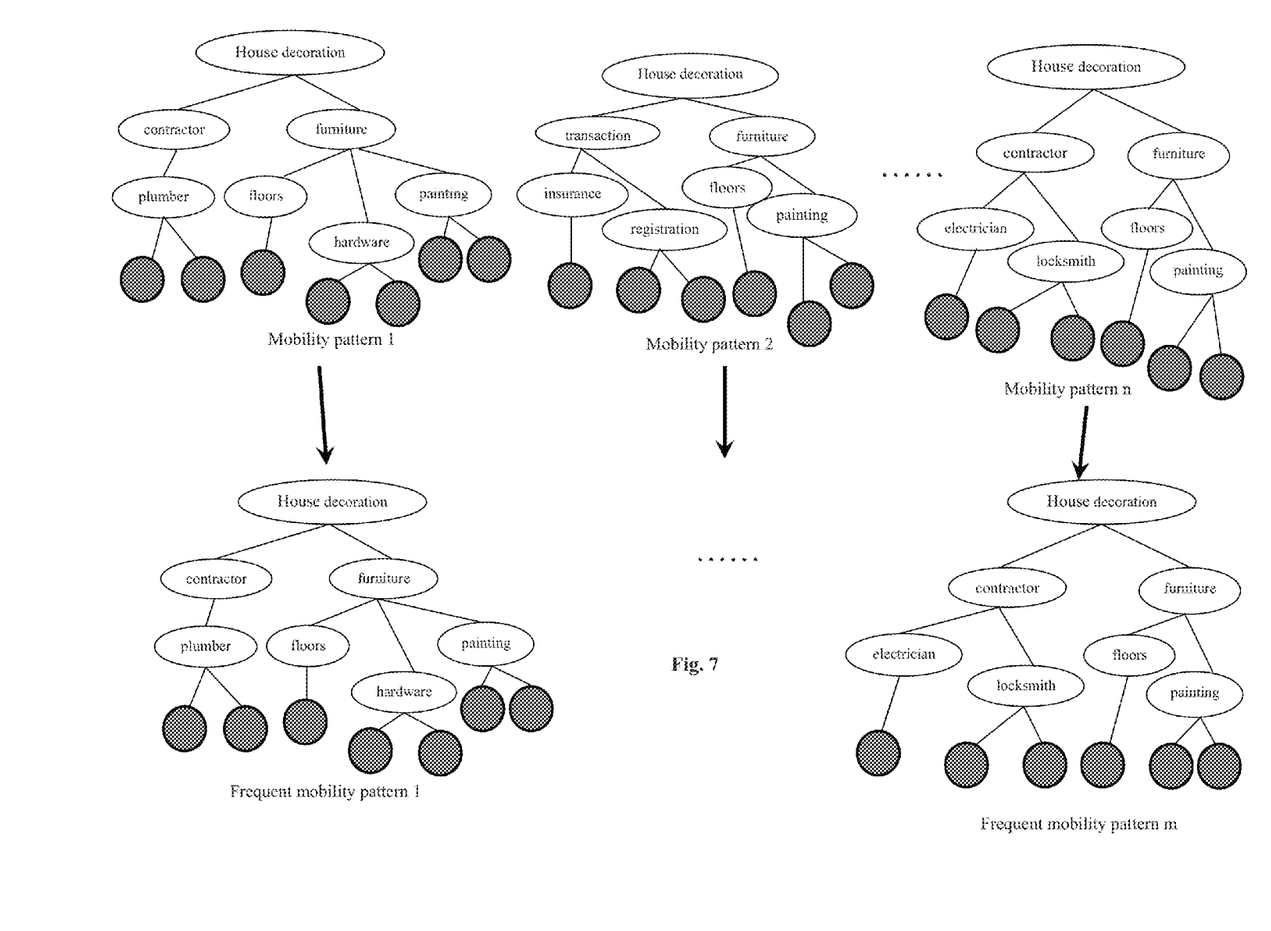
FIG. 7 is a schematic diagram showing frequent mobility patterns generated by a frequent mobility pattern generation device according to an embodiment of the present invention.

FIG. 7 is a schematic diagram showing frequent mobility patterns generated by a frequent mobility pattern generation device according to an embodiment of the present invention. As shown in upper portion of FIG. 7, candidate mobility patterns of all users determined by the determining unit 640 include mobility pattern 1, mobility pattern 2 . . . , mobility pattern n, for the topic "house decoration".

The selecting unit 650 may compare an occurrence number for each mobility pattern with a preset threshold value. If the occurrence number is larger than the threshold value, the corresponding mobility pattern will be selected as a frequent mobility pattern. For example, as shown in FIG. 7, it is assumed the occurrence number for the mobility pattern 1 is larger than the threshold value. Then, the mobility pattern 1 is selected by the selecting unit 650 as a frequent mobility pattern. On the other hand, if the occurrence number for the mobility pattern 2 is not larger than the threshold value, the selecting unit 650 discards the mobility pattern 2, and so on. That is, assuming the occurrence number for mobility pattern n is larger than the threshold value, the mobility pattern n is selected by the selecting unit 650 as a frequent mobility pattern m, where m n.

It can be appreciated by those skilled in the art that the selecting unit 650 can select frequent mobility patterns in other ways. For example, if the occurrence number for a certain mobility pattern divided by a total occurrence number for all of the mobility patterns is larger than a threshold value, this mobility pattern is selected by the selecting unit 650 as a frequent mobility pattern.

It is noted that the frequent mobility pattern generated by the frequent mobility pattern generation device 60 may be stored in a storage device (such as a non-volatile memory) for use by the mobility pattern mining device 10 as mentioned above. Thus, even if the amount of historical data for individual users is insufficient, mobility patterns about topics for the individual users can be obtained by the mobility pattern mining device 10 early based on mobility patterns about topics for a group of users generated by the mobility pattern generation device 60. Thus, personalized information can be provided to users early.

Figure 8:
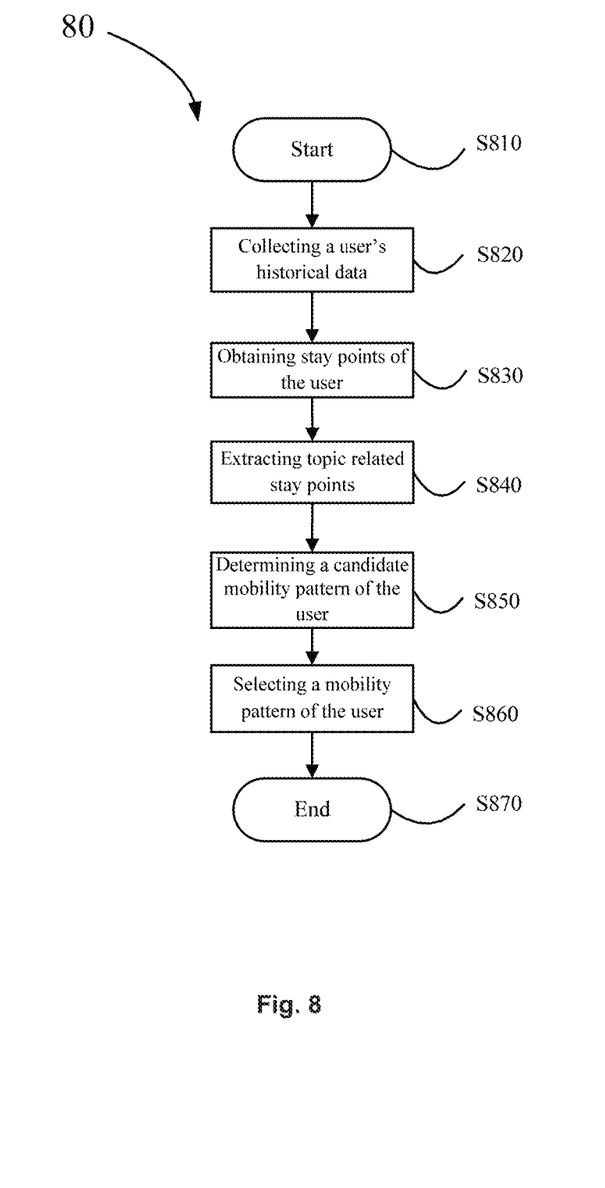
FIG. 8 is a flowchart illustrating a mobility pattern mining method according to an embodiment of the present invention.

FIG. 8 is a flowchart illustrating a mobility pattern mining method according to an embodiment of the present invention. As shown in FIG. 8, the method 80 starts with step S810.

At step S820, a user's historical data is collected. For example, the user's historical data may comprise location, time, and semantics of the location. Location data may comprise longitude/latitude data, and is not limited thereto.

At step S830, stay points of the user are obtained from the historical data.

At step S840, a semantic tree for a certain topic is obtained and topic related stay points are extracted from the stay points of the user by using the semantic tree for the certain topic. For example, the stay points of the user may be matched with leaf nodes of the semantic tree for the certain topic and the matched stay points may be selected as the topic related stay points. Preferably, the semantic tree for the certain topic is obtained from WordNET.

At step S850, a candidate mobility pattern of the user is determined based on the topic related stay points. For example, a sub tree of the semantic tree for the certain topic may be combined with the topic related stay points as leaf nodes to form the candidate mobility pattern of the user.

At step S860, a frequent mobility pattern which matches the candidate mobility pattern of the user best is selected from a frequent mobility pattern database related to the certain topic, wherein the frequent mobility pattern database is set in advance based on historical data for a plurality of users. For example, the frequent mobility pattern which matches the candidate mobility pattern of the user best may satisfy at least one of the following conditions: (1) the frequent mobility pattern and the candidate mobility pattern of the user have a maximum number of nodes of the same semantics; and (2) in the frequent mobility pattern and the candidate mobility pattern of the user, nodes of the same semantics are closest to leaf nodes.

Finally, the method 80 ends at step S870.

Figure 9:
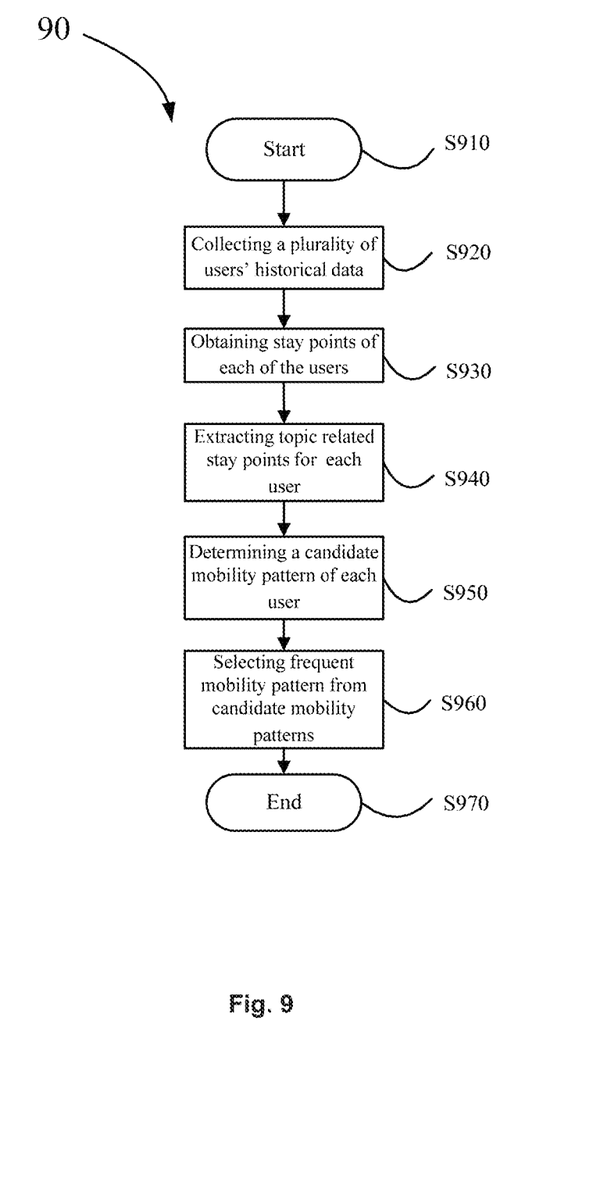
FIG. 9 is a flowchart illustrating a frequent mobility pattern generation method according to an embodiment of the present invention.

FIG. 9 is a flowchart illustrating a frequent mobility pattern generation method according to an embodiment of the present invention. As shown in FIG. 9, the frequent mobility pattern generation method 90 starts with step S910.

At step S920, a plurality of users' historical data is collected. The plurality of users' historical data may comprise location, time, and semantics of the location.

At step S930, stay points of each of the plurality of users are obtained from the historical data.

At step S940, a semantic tree for a certain topic is obtained and topic related stay points are extracted from the stay points of each of the user by using the semantic tree for the certain topic. For example, the stay points of each user may be matched with leaf nodes of the semantic tree for the certain topic and the matched stay points may be selected as the topic related stay points of the user. Preferably, the semantic tree for the certain topic is obtained from WordNET.

At step S950, a candidate mobility pattern of each user is determined based on the topic related stay points of the user. For example, for each user, a sub tree of the semantic tree for the certain topic may be combined with the topic related stay points of the user as leaf nodes to form the candidate mobility pattern of the user.

At step S960, a frequent mobility pattern is selected from the candidate mobility patterns of all the users. For example, a candidate mobility pattern which occurs more than a threshold number of times may be selected from the candidate mobility patterns of all the users as the frequent mobility pattern. Alternatively, a candidate mobility pattern for which a ratio of occurrence number to a total occurrence number is larger than a threshold value is selected as the frequent mobility pattern.

Finally, the method 90 ends at step S970.

It is to be noted here that the above embodiments of the present invention can be implemented in software, hardware or any combination thereof. For example, various components in the mobility pattern mining device and the frequent mobility pattern generation device according to the above embodiments can be implemented using various devices including, but not limited to, analog circuit, digital circuit, general purpose processor, digital signal processing (DSP) circuit, programmable processor, application specific integrated circuit (ASIC), field programmable gate array (FPGA), programmable logical device (CPLD), etc.

In addition, it can be appreciated by those skilled in the art that the user's historical data as described in the above embodiments can be stored in a local database or a distributed database or a remote database.

Further, the embodiments of the present disclosure can be implemented in a computer program product. In particular, the computer program product can be a product having a computer readable medium with computer program logics coded thereon. When executed in a computing device, the computer program logics provide operations for implementing the above solutions of the present invention. When executed in at least one processor of a computing system, the computer program logics cause the processor to perform the operations (methods) described in the embodiments of the present invention. Typically, this arrangement of the present invention is provided as software, codes and/or other data structures set or coded on a computer readable medium such as optical medium (e.g., CD-ROM), floppy disk or hard disk, or firmware or micro-codes on one or more ROM or RAM or PROM chips, or software images or shared database downloadable from one or more modules. The software or firmware or arrangement can be loaded onto a computing device to enable one or more processors in the computing device to implement the solutions described in the embodiments of the present invention.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A mobility pattern mining device, comprising:
a data collecting unit configured to collect a user's historical data;
a stay point obtaining unit configured to obtain stay points of the user from the historical data;
an extracting unit configured to obtain a semantic tree for a certain topic and extract topic related stay points from the stay points of the user by using the semantic tree for the certain topic;
a determining unit configured to determine a candidate mobility pattern of the user based on the topic related stay points; and
a selecting unit configured to select a frequent mobility pattern which best matches the candidate mobility pattern of the user from a frequent mobility pattern database related to the certain topic;
wherein the frequent mobility pattern database is set in advance based on historical data for a plurality of users.

2. The mobility pattern mining device according to claim 1, wherein the user's historical data comprises location, time, and semantics of the location.

3. The mobility pattern mining device according to claim 1, wherein the extracting unit is configured to match the stay points of the user with leaf nodes of the semantic tree for the certain topic and select the matched stay points as the topic related stay points.

4. The mobility pattern mining device according to claim 1, wherein the determining unit is configured to combine a sub tree of the semantic tree for the certain topic with the topic related stay points as leaf nodes to form the candidate mobility pattern of the user.

5. The mobility pattern mining device according to claim 1, wherein the frequent mobility pattern which best matches the candidate mobility pattern of the user satisfies at least one of the following conditions: (1) the frequent mobility pattern and the candidate mobility pattern of the user have a maximum number of nodes of the same semantics; and (2) in the frequent mobility pattern and the candidate mobility pattern of the user, nodes of the same semantics are closest to leaf nodes.

6. The mobility pattern mining device according to claim 1, wherein the semantic tree for the certain topic is obtained from WordNET.

7. A frequent mobility pattern generation device, comprising:
a data collecting unit configured to collect a plurality of users' historical data;
a stay point obtaining unit configured to obtain stay points of each of the plurality of users from the historical data;
an extracting unit configured to obtain a semantic tree for a certain topic and extract topic related stay points from the stay points of each of the user by using the semantic tree for the certain topic;
a determining unit configured to determine a candidate mobility pattern of each user based on the topic related stay points of the user; and
a selecting unit configured to select a frequent mobility pattern from the candidate mobility patterns of all the users.

8. The frequent mobility pattern generation device according to claim 7, wherein the extracting unit is configured to match the stay points of each user with leaf nodes of the semantic tree for the certain topic and select the matched stay points as the topic related stay points of the user.

9. The frequent mobility pattern generation device according to claim 7, wherein the determining unit is configured to combine, for each user, a sub tree of the semantic tree for the certain topic with the topic related stay points of the user as leaf nodes to form the candidate mobility pattern of the user.

10. The frequent mobility pattern generation device according to claim 7, wherein the selecting unit is configured to select, from the candidate mobility patterns of all the users, a candidate mobility pattern, which occurs more than a threshold number of times as the frequent mobility pattern.

11. A mobility pattern mining method, comprising:
collecting a user's historical data;
obtaining stay points of the user from the historical data;
obtaining a semantic tree for a certain topic and extracting topic related stay points from the stay points of the user by using the semantic tree for the certain topic; determining a candidate mobility pattern of the user based on the topic related stay points; and
selecting a frequent mobility pattern which matches the candidate mobility pattern of the user best from a frequent mobility pattern database related to the certain topic; wherein the frequent mobility pattern database is set in advance based on historical data for a plurality of users.

12. The mobility pattern mining method according to claim 11, wherein the user's historical data comprises location, time, and semantics of the location.

13. The mobility pattern mining method according to claim 11, wherein the stay points of the user are matched with leaf nodes of the semantic tree for the certain topic and the matched stay points are selected as the topic related stay points.

14. The mobility pattern mining method according to claim 11, wherein a sub tree of the semantic tree for the certain topic is combined with the topic related stay points as leaf nodes to form the candidate mobility pattern of the user.

15. The mobility pattern mining method according to claim 11, wherein the frequent mobility pattern which best matches the candidate mobility pattern of the user satisfies at least one of the following conditions: (1) the frequent mobility pattern and the candidate mobility pattern of the user have a maximum number of nodes of the same semantics; and (2) in the frequent mobility pattern and the candidate mobility pattern of the user, nodes of the same semantics are closest to leaf nodes.

16. The mobility pattern mining method according to claim 11, wherein the semantic tree for the certain topic is obtained from WordNET.

* * * * *